(12) United States Patent
Ikeda

(10) Patent No.: US 9,731,252 B2
(45) Date of Patent: Aug. 15, 2017

(54) AERATION NOZZLE, AND BLOCKAGE REMOVAL METHOD FOR SAID AERATION NOZZLE

(71) Applicant: KABUSHIKIKAISHA SEIWA, Fukuoka (JP)

(72) Inventor: Akinori Ikeda, Yamaguchi (JP)

(73) Assignee: KABUSHIKIKAISHA SEIWA, Fukuoka (JP)

( * ) Notice: Subject to any disclaimer, the term of this patent is extended or adjusted under 35 U.S.C. 154(b) by 225 days.

(21) Appl. No.: 14/418,072

(22) PCT Filed: Nov. 27, 2013

(86) PCT No.: PCT/JP2013/081959
§ 371 (c)(1),
(2) Date: Jan. 28, 2015

(87) PCT Pub. No.: WO2014/084276
PCT Pub. Date: Jun. 5, 2014

(65) Prior Publication Data
US 2015/0190763 A1 Jul. 9, 2015

Related U.S. Application Data

(60) Provisional application No. 61/730,441, filed on Nov. 27, 2012.

(51) Int. Cl.
*B01F 3/04* (2006.01)
*C02F 3/20* (2006.01)
(Continued)

(52) U.S. Cl.
CPC ...... *B01F 3/04269* (2013.01); *B01F 3/04248* (2013.01); *B01F 3/04517* (2013.01);
(Continued)

(58) Field of Classification Search
CPC ............. B01F 3/04269; B01F 7/00275; B01F 7/00033; B01F 2215/0052; C02F 2303/26
See application file for complete search history.

(56) References Cited

U.S. PATENT DOCUMENTS 3,844,897 A * 10/1974 Mueller .............. B01F 3/04588
261/87
4,169,047 A * 9/1979 Wilson ..................... B03D 1/20
209/164

(Continued)

FOREIGN PATENT DOCUMENTS

| JP | 51-084456 A | 7/1976 |
|---|---|---|
| JP | 1993-067325 A | 9/1993 |

(Continued)

OTHER PUBLICATIONS

International Search Report for PCT/JP2013/081959.

*Primary Examiner* — Amber R Orlando
*Assistant Examiner* — Stephen Hobson
(74) *Attorney, Agent, or Firm* — Konomi Takeshita

(57) ABSTRACT

An aeration nozzle is provided, having on one end an air supply port (16a) connected to an aeration pump (13) and a waste water suction port (17) for suctioning waste water in a processing tank (3, 4), and having a micro-bubble generation unit (18), provided facing the air supply port, for mixing air supplied by the air supply port and waste water suctioned from the waste water suction port and generating micro-bubbles (9), wherein
a plurality of blades of cylindrical micro-bubble generators (19) included in the micro-bubble generation unit (18) is configured such that
tip ends of the blades are formed so as to face one another around the center of the cylindrical micro-bubble generators (19a, 19b); and (Continued)

by being formed from an elastic member (such as rubber), the tip ends of the blades are configured so as to bend with the base ends as starting points.

3 Claims, 5 Drawing Sheets

(51) Int. Cl.
| | |
|---|---|
| *B01F 13/10* | (2006.01) |
| *B01F 15/00* | (2006.01) |
| *B08B 1/00* | (2006.01) |
| *B05B 15/02* | (2006.01) |
| *B01F 7/00* | (2006.01) |
| *C02F 101/32* | (2006.01) |
| *C02F 3/30* | (2006.01) |
| *C02F 103/10* | (2006.01) |
| *C02F 103/32* | (2006.01) |

(52) U.S. Cl.
CPC .......... *B01F 7/003* (2013.01); *B01F 7/00033* (2013.01); *B01F 7/00275* (2013.01); *B01F 13/1016* (2013.01); *B01F 15/00038* (2013.01); *B05B 15/0208* (2013.01); *B08B 1/00* (2013.01); *C02F 3/20* (2013.01); *C02F 3/205* (2013.01); *B01F 2003/04283* (2013.01); *B01F 2003/04319* (2013.01); *B01F 2003/04368* (2013.01); *B01F 2003/04432* (2013.01); *B01F 2215/008* (2013.01); *B01F 2215/0052* (2013.01); *C02F 3/301* (2013.01); *C02F 2101/32* (2013.01); *C02F 2103/10* (2013.01); *C02F 2103/322* (2013.01); *C02F 2203/006* (2013.01); *C02F 2209/005* (2013.01); *C02F 2303/26* (2013.01); *Y02W 10/15* (2015.05)

(56) References Cited

U.S. PATENT DOCUMENTS

| | | | | |
|---|---|---|---|---|
| 5,993,158 | A * | 11/1999 | Young | A47J 43/1068 416/132 A |
| 2001/0038575 | A1 | 11/2001 | Mathys et al. | |
| 2009/0103393 | A1 | 4/2009 | Moser et al. | |
| 2010/0133174 | A1* | 6/2010 | Hoefken | B01F 7/0005 210/512.3 |
| 2013/0032957 | A1* | 2/2013 | Nicholson | B01F 7/00733 261/84 |
| 2014/0042088 | A1* | 2/2014 | Yoshida | C02F 3/02 210/629 |

FOREIGN PATENT DOCUMENTS

| | | |
|---|---|---|
| JP | 2002-001077 A | 1/2002 |
| JP | 2004-141701 A | 5/2004 |
| JP | 2005-144425 A | 6/2005 |
| JP | 2008-012470 A | 1/2008 |
| JP | 2008-018330 A | 1/2008 |
| JP | 2009-541045 A | 11/2009 |
| JP | 2010-012443 A | 1/2010 |
| JP | 2010-269301 A | 2/2010 |
| JP | 2010-104931 A | 5/2010 |
| JP | 2010-268829 A | 12/2010 |
| KR | 101163971 | 7/2012 |

* cited by examiner

AERATION NOZZLE, AND BLOCKAGE REMOVAL METHOD FOR SAID AERATION NOZZLE

FIELD OF THE INVENTION

The present invention pertains to an aeration nozzle used in waste water processing devices and a method for removing blockages from said aeration nozzle.

BACKGROUND OF THE INVENTION

In order to purify water contaminated by mineral oil or vegetable oil in factories and the like which use cooling water and rinse water, a processing method is commonly used in which aerobic bacteria, etc., is reacted in the waste water thereof and the contaminating components are dissolved from the aerobic bacteria, etc., being multiplied. In order to multiply aerobic bacteria, etc., in such types of waste water processing devices, it is necessary to provide an environment for the aerobic bacteria, etc., to survive by mixing microscopic bubbles in the waste water and encouraging aerobic respiration.

Devices which generate and mix microscopic bubbles in such types of waste water are called "aerators," and are configured so as to mix waste water and air and to activate aerobic bacteria within the waste water, by being placed in the waste water to be purified. Conventionally, such aerators were constructed to be provided internally with a helical blade, and an upward stream, which was produced from airflow, was cast in whirlpool-like manner by such helical blades, etc., promoting the mixing of bubbles upstream.

In aerators provided with such blades, it is assumed that blockages are caused by foreign matter within the waste water getting caught on the blades. However, removing and cleaning, etc., such aerators provided internally with blades is generally difficult, and problematic in terms of maintenance.

SUMMARY OF THE INVENTION

The present invention was created in view of the abovementioned problems, with the aim of providing a highly efficient and easily maintained aeration nozzle and a method for removing blockages from said aeration nozzle.

According to the present invention (1), an aeration nozzle having on one end an air supply port connected to an air supply source and a waste water suction port for suctioning waste water in a processing tank, and having a micro-bubble generation unit, provided facing the air supply port, for mixing air supplied by the air supply port and waste water suctioned from the waste water suction port and generating micro-bubbles, wherein the micro-bubble generation unit is configured to have a stack of multiple cylindrical bodies arranged in a position through which air fed by the air suction port passes, each cylindrical body comprising of a cylindrical main body and a plurality of blades projecting from said main body toward the center; and the blades of the cylindrical body is characterized by
being configured such that base ends of the blades are fixed on the inner surface of the cylindrical body and each tip end is formed so as to face one another around the center of said cylindrical body; and
by being formed from an elastic member (such as rubber), tip ends of the blades are configured so as to bend with the base ends as a starting point, whereby the present invention is configured such that a maintenance jig may be inserted into the upper portion of the processing tank. With this configuration, the maintenance jig, for example, may be entered between the blades, and the blades may be bent by the jig and foreign matter clogged between the blades may be removed.

Moreover, by means of the abovementioned configuration, foreign matter does not easily get caught, and even if caught, the foreign matter quickly and easily dislodges due to the abovementioned blades elastically vibrating during operation.

(2) In the aeration nozzle of (1), the blades are characterized by being configured such that width of the blades gradually widens from the air supply port side, whereby the elasticity of the blades is provided.

(3) In the aeration nozzle of (1), the blades are characterized by having, along a direction in which the air passes, a plurality of through holes which allow the passage of air passing through the blades, whereby the elasticity of the blades is provided.

(4) In the aeration nozzle of (1), the blades are characterized by having concave portions (which have edges) provided on a surface thereof along the direction in which air passes, whereby the elasticity of the blades is provided.

(5) In the aeration nozzle of (1), the cylindrical bodies are provided overlapping in multiple levels in the axial direction through which air and waste water that are introduced into the aeration nozzle pass, and the blades provided in each of the cylindrical bodies are arranged such that the position of each blade with respect to proximal blades in the axial direction is deviated at a different angle around the axis, and said aeration nozzle is characterized by being configured such that, in cases in which the tip end of a maintenance jig for removing blockages is inserted between blades of an upper-level cylindrical body and the blades are bent, said tip end is able to be inserted between blades in a lower-level cylindrical body.

(6) A waste water unit is attached in advance to a processing tank in which the nozzle of (1) temporarily stores waste water. The waste water unit is capable of being adopted in any facility (factories, commercial kitchens, general residences).

(7) A method for removing aeration nozzle blockages wherein blockages are removed in a state in which the aeration nozzle of (1) is installed within a waste water processing tank, the method being characterized by having a step for widening a clearance between the blades by elastically bending the blades, which are formed from said elastic member, using a maintenance jig having one or a plurality of tip ends and inserting between the blades and twisting the tip ends of said maintenance jig.

(8) In the method of (7), the step for widening the clearance between the blades is characterized by occurring in a state in which the air supply source is being operated.

(9) In the method of (8), the maintenance jig is characterized by having an extension with a length that corresponds to the depth of the waste water processing tank and by being configured so as to enable the step for widening the clearance between the blades to be carried out in a state in which the waste water is being stored in the waste water processing tank.

Features of the present invention other than the abovementioned features shall be apparent to people skilled in the art based on the attached drawings and disclosures on preferred embodiments which are explained based on said drawings.

DETAILED DESCRIPTION OF THE INVENTION

Embodiments of the present invention will be explained below referencing the attached drawings.

Figure 1:
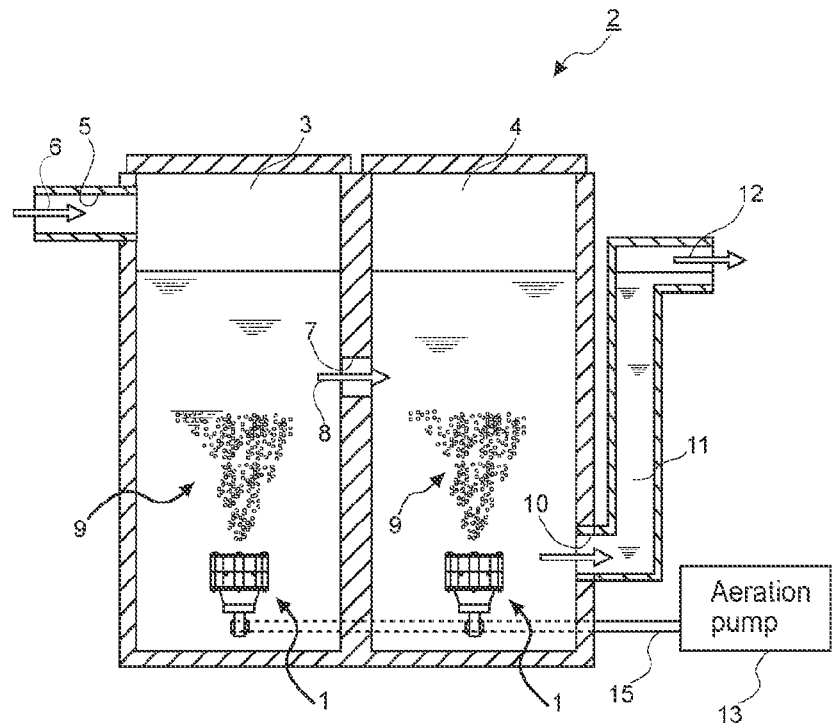
FIG. 1 is a side view illustrating a waste water processing device provided with the aeration nozzle as in one embodiment of the present invention.

FIG. 1 illustrates a waste water processing device (2) equipped with an aeration nozzle (1) in the present embodiment.

Said waste water processing device (2) is connected to a septic tank (not illustrated) which is commonly equipped in residences and factories, and is a device which has a function for further purifying waste water from the septic tank and which has first and second processing tanks (3, 4). Said first and second processing tanks (3, 4) have a cylindrical internal shape and said aeration nozzle (1) is equipped in the bottom portion of each.

A waste water inflow port (5) is connected to the upper portion of the first processing tank (3), and as indicated by an arrow (6), waste water from the septic tank flows into the first processing tank (3). Moreover, the first and second processing tanks (3, 4) are connected to one another via a flow port (7) in the middle part of the height direction, and as indicated by an arrow (8), waste water processed in the first processing tank (3) flows into the second processing tank (4) through said flow port (7).

As will be explained in detail hereafter, micro-bubbles (9) which spout out from the aeration nozzle (1) effectively and efficiently circulate in the circumferential direction and the vertical direction along the cylindrical inner wall of the first and second processing tanks (3, 4) and encourage the decomposition of organic matter by activating bacteria present in the processing tank.

Waste water in the first processing tank (3) is pushed into the second processing tank (4) via the flow port (7) and waste water processing is carried out sequentially in the first and second processing tanks (3, 4).

A spout (10) is provided in the lower portion of the second processing tank (4), and said spout (10) is connected to an discharge pipe (11). Said discharge pipe (11) extends upward from the lower portion of the second processing tank (4) and bends in a perpendicular direction at a prescribed height at which overflow occurs, and as indicated by an arrow (12), the discharge pipe (11) is configured to discharge processed waste water.

Moreover, an aeration pump (13) is provided on the outside of said waste water processing device, and said aeration pump (13) is connected via a connection pipe (15) to the aeration nozzle (1) provided in each of the processing tanks (3, 4), and air is supplied from the aeration pump (13) into the aeration nozzle (1) at a prescribed pressure (flow rate).

Although the capacity of the aeration pump (13) may vary according to the size of the tank and the size of the aeration nozzle (1), the capacity in the present embodiment is 60 L-250 L per minute (60-250 L/mim).

Figure 2:
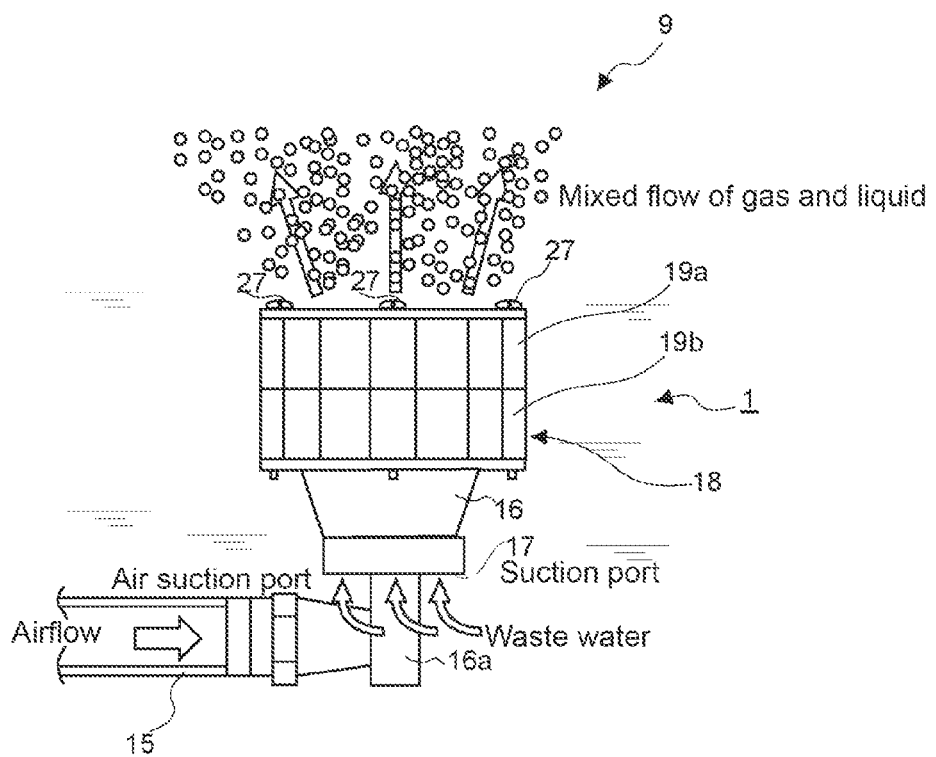
FIG. 2 is likewise a side view illustrating the aeration nozzle.
Figure 3:
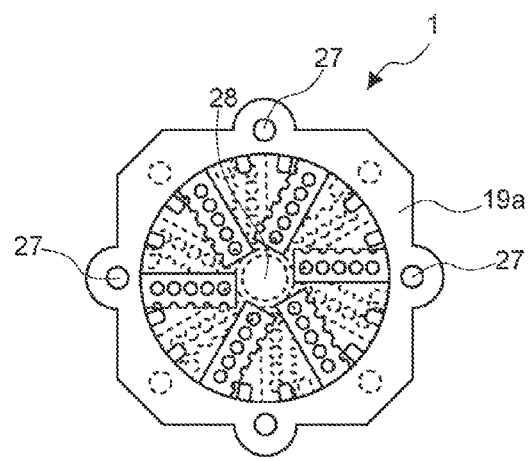
FIG. 3 is likewise a top view.
Figure 4:
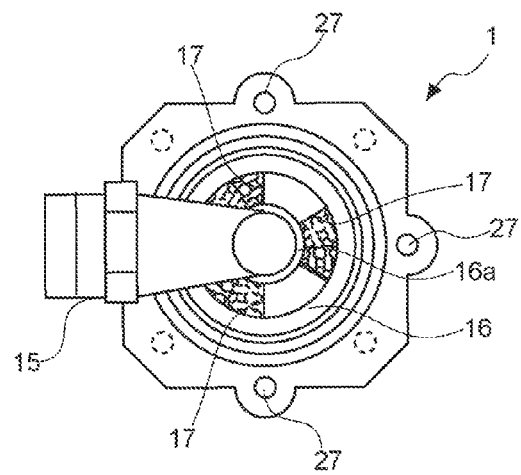
FIG. 4 is likewise a bottom view.

FIGS. 2-4 are a side view, top view, and bottom view illustrating the aeration nozzle (1) enlarged.

The lower end (air suction port (16a)) of the aeration nozzle (1) is connected to the connection pipe (15) from the aeration pump (13), and the portion to which said connection pipe (15) is connected is a substantially cone-shaped suction cover (16), and waste water in the processing tank (3) is suctioned from a waste water suction port (17) provided near the connection pipe (15).

A micro-bubble generation unit (18) is fixed to the upper side of said suction cover (16). Said micro-bubble generation unit (18) is provided with cylindrically shaped bubble generators (19a, 19b), which are provided in a stacked state with two levels, an upper level and a lower level, in the axial direction.

Figure 5:
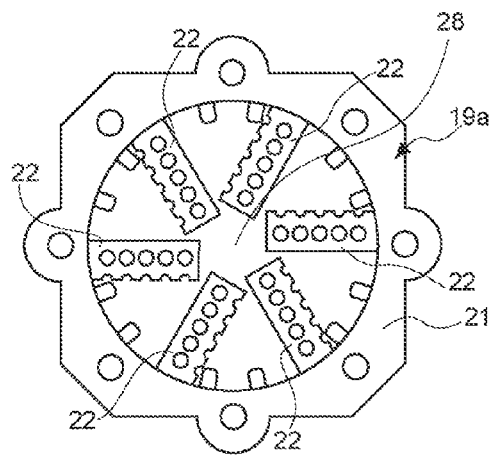
FIG. 5 is likewise a plan view illustrating an upper-level cylindrically shaped bubble generator.
Figure 6:
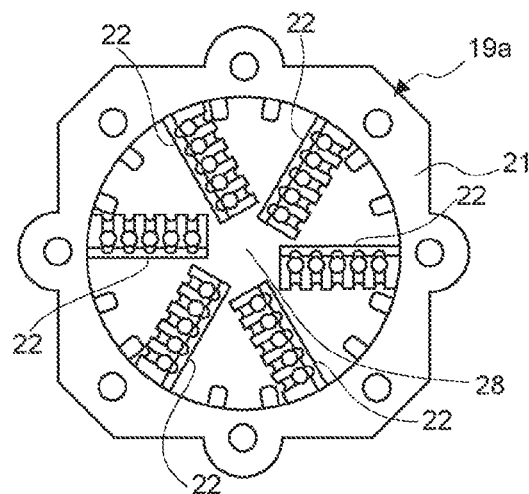
FIG. 6 is likewise a bottom view.

Amongst said cylindrically shaped bubble generators (19a, 19b), the micro-bubble generator (19a) provided in the upper level is illustrated in FIGS. 5 and 6, which are a top view and a bottom view.

Said cylindrically shaped bubble generator (19a) is configured from a cylindrical body (21) and plurality of blades (22) which project from said body (21) toward the center. Namely, the base ends of said blades (22) are each fixed on the inner surface of said body (21) and each tip end is formed so as to face one another from a prescribed clearance (opening (28)) around the center of said body (21).

Moreover, from being formed from a rubber material, said blades (22) are flexibly configured such that the tip ends bend with the base ends as a starting point. In the present embodiment the entire bubble generator (19a) containing said blades (22) and body (21) is formed from a rubber material. However, said body (21) may be formed from a rigid body such as stainless steel, while only the blades (22) are formed from an elastic body such as a rubber material.

Furthermore, in addition to the material, the flexibility of said blades (22) is improved from holes and grooves, etc., being formed in the following manner, and elasticity is able to be controlled so as to be made suitable for removing blockages.

Figure 7:
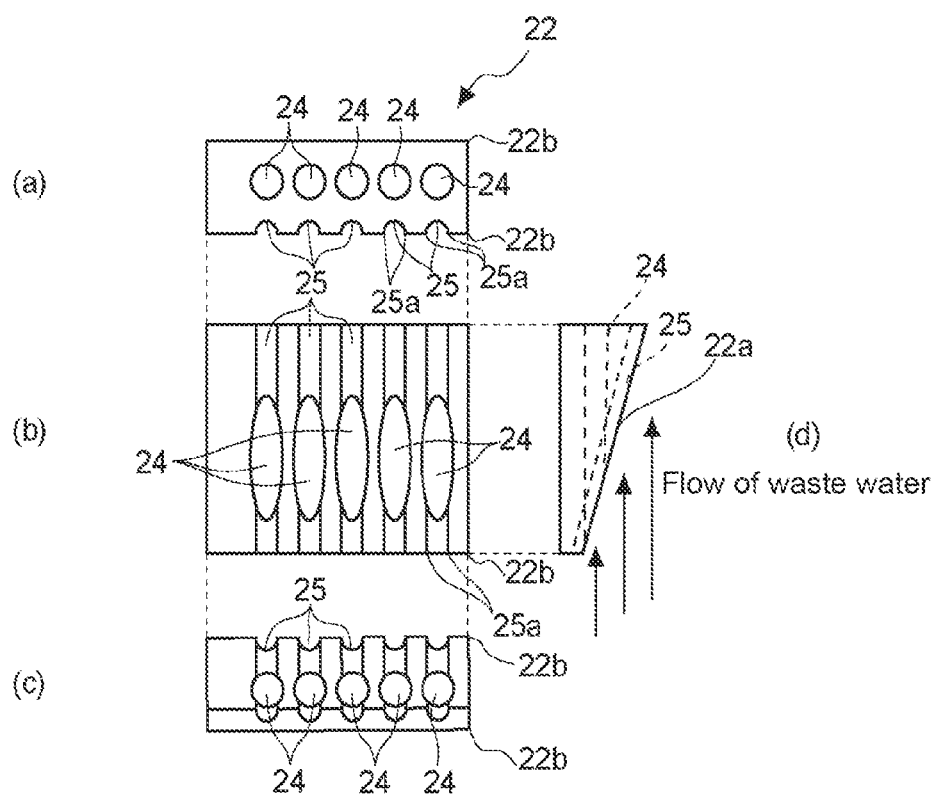
FIG. 7 is likewise a schematic drawing illustrating the blade configuration.

FIG. 7 illustrates the blade section enlarged, and within the drawing (a) is a top view of said blades (22), (b) is a front view, (c) is a bottom view, and (d) is a side view when the blades (22) are viewed from the center of said bubble generator (19a).

Said blades (22) are configured with one side surface (22a) having a tapered shape such that the width gradually widens upward from the suction port (17) side, and said blades (22) have a plurality of fine holes (24) which allow the passage of air passing through the blades (22) along the direction in which waste water passes. Furthermore, said blades (22) have grooves (25) provided on the surface thereof along the direction in which air passes. The borders (25a) between said grooves (25) and blades (22) form sharp edges, and support the generation of bubbles, as will be explained hereafter. Moreover, the edges (22b) of the tip ends in the direction in which the blades (22) protrude also exhibit the same function.

The lower-level bubble generator (19b) arranged on the bottom side of the upper-level bubble generator (19a) is also essentially the same shape, and has a body (21) and a plurality of blades (22) protruding toward the direction of the center within said body. However, the blades (22) are arranged, as illustrated by the dashed lines in FIG. 3, to only be deviated by 30 degrees in the circumferential direction.

Thus, the upper-level and lower-level bubble generators (19a, 19b) and the suction port cover are mutually fixed by means of four screws (27) in four locations in the circumferential direction.

Next, the bubble (9) generating function of the micro-bubble generation unit (18) will be explained.

Air supplied from said aeration pump (13) via said connection pipe (15) spouts out in an upward direction to the inside of said suction port cover (16), whereby the inside of the cover (16) becomes a negative pressure, and waste water within said processing tanks is therefore suctioned inside of the suction port cover (16) from the supply port (17).

Thus, waste water and air introduced inside of the suction port cover (16) are introduced into said two-level bubble generators (19a, 19b). The upward moving mixed flow of gas and liquid forms microscopic bubbles by vigorously colliding with the blades (22), at which time cavitation phenomenon starts to occur. Due to resistance from the blades (22), a stream containing the microscopic bubbles which rises within the nozzle becomes concentrated in the opening (28) in the center. As the flow rate increases, the pressure in the area thereof decreases (from Bernoulli's principle). Thus, a portion of the air within the depressurized fluid forms even finer bubbles accompanying the pressure reduction, while said bubbles simultaneously form even more microscopic bubbles from being disturbed by a swirling stream generated by the edges of the tip ends of the blades (22). Moreover, since fine holes (24) are formed on each blade (22), bubbles are produced by means of a similar action, i.e. cavitation, which occurs when the fluid passes through said fine holes (24). In such cases, the smaller the diameter of the opening (28) and fine holes (24), the greater the flow rate of the passing fluid, causing even more effective cavitation to occur and promoting the generation of micro-bubbles.

Thereafter, the stream which passed through the opening (28) is released at once and the breakdown of bubbles, i.e. the generation of numerous micro-bubbles (9) occurs, and micro-bubbles which break down by becoming miniscule disappear while spreading throughout the tank. Moreover, fluid which escaped from the opening (28) in the center to the periphery collides with the edges (22b, 25b) and the grooves (25), whereby vortex cavitation and small-scale turbulence occur, and cloud cavitation also occurs depending on the vortex cavitation and conditions. Thus, the generation of microscopic bubbles is further promoted.

In order to make cavitation occur effectively, the output of the aeration pump (13) is appropriately determined according to conditions, such as the waste water to be processed, and in the present embodiment, the output is set at 30 L-250 L per minute.

Since foreign matter such as waste and mud is intermixed, blockages may occur if the diameter of the opening (28) and the fine holes (24), or the passing width of the clearance between the blades (22) is small. However, since the blades (22) of the present embodiment are formed from an elastic body which is a rubber material, micro-vibration from the resistance and cavitation of passing fluid readily occur, inhibiting blockages.

Figure 8:
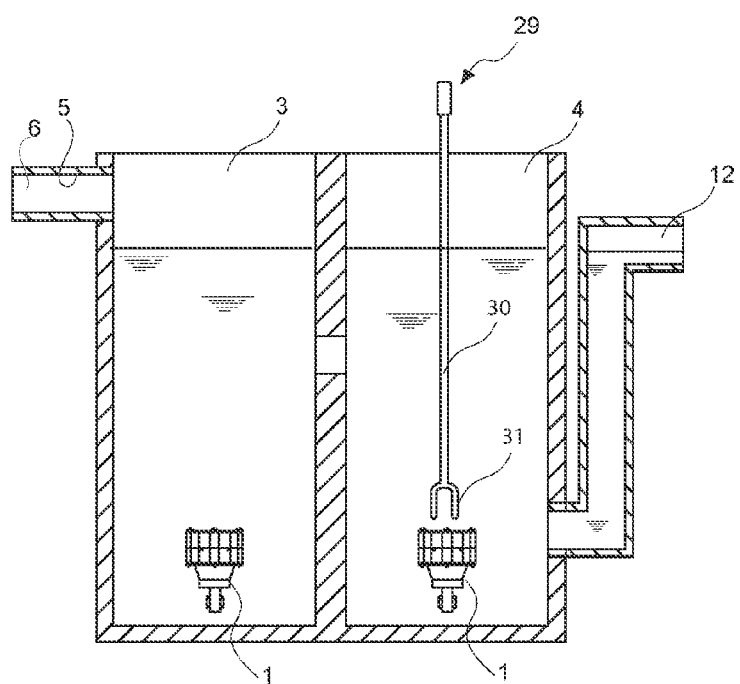
FIG. 8 is likewise a schematic drawing for cases in which the jig for removing nozzle blockages is used.

However, in the event that a blockage still occurs, it is generally difficult for an aeration nozzle (1) in which the blades (22) are provided internally to be taken out and cleaned. However, in the present embodiment, cleaning is performed from the outside using a maintenance jig, such as illustrated in FIG. 8 (29).

Figure 9:
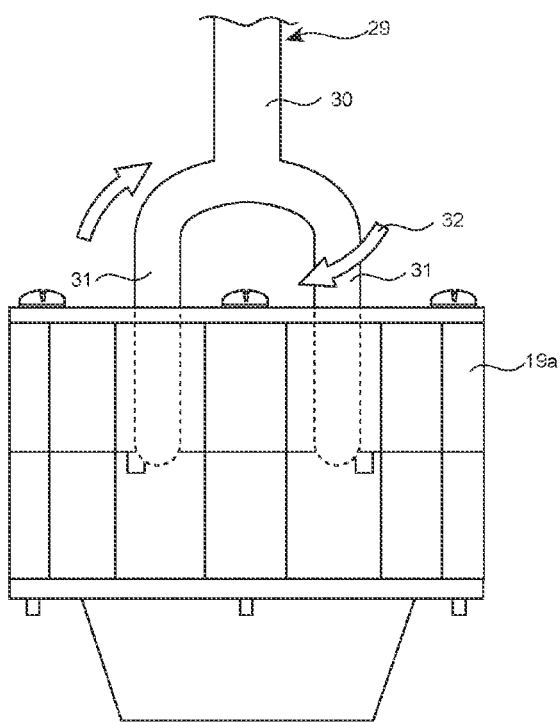
FIG. 9 is likewise a side view illustrating the tip end of the jig enlarged.

Said maintenance jig (29) has a long extension (30) and a two-pronged tip end (31), and is inserted into the processing tanks (3, 4) from an upper opening on the processing tanks (3, 4), and said two-pronged tip end (31) is inserted into the clearance between the blades (22). FIG. 9 is a side view illustrating said state and FIG. 10 is likewise a top view.

Figure 10:
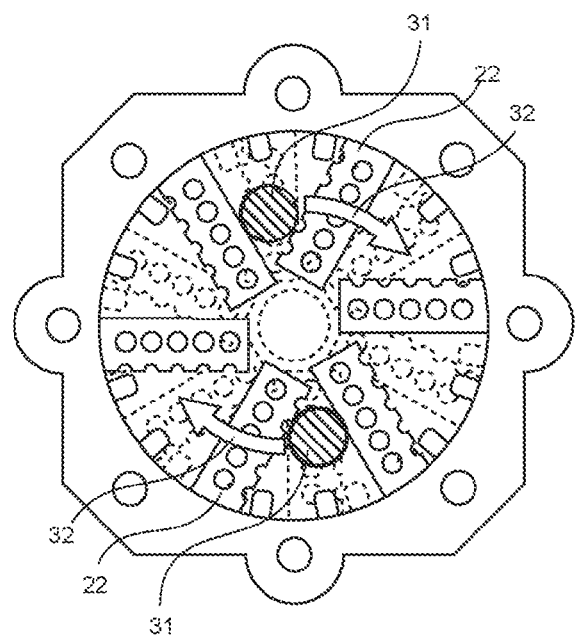
FIG. 10 is likewise a plan view.
Figure 11:
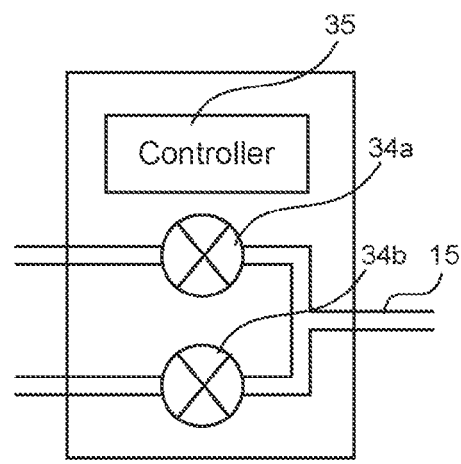
FIG. 11 is a schematic drawing of an opening-closing valve illustrating a different embodiment.

Next, as illustrated by the arrow (32) in FIG. 10, by driving the extension (30) of said jig (29) around the axis, the tip ends of the blades (22) composed from said elastic material are bent, and the clearance between the blades (22) can be widened. By performing this operation while the aeration nozzle (1) is being operated, foreign material caught between the blades (22) may be removed by being pushed out by the stream.

The maintenance jig (29) is not limited to having two prongs, but may also have three, four, five, or six prongs, etc., which may be determined, as appropriate, according to the size, operability, and work efficiency of the aeration nozzle (1).

Moreover, since the blades (22) in the present embodiment are provided with a plurality of fine holes (24) passing through in the vertical direction and grooves (25), the configuration is such that flexibility on the tip ends thereof is improved and performing work by means of said maintenance jig (29) is easier. From this viewpoint, it is preferable to provide the size, position, and number of said fine holes (24) and grooved portions (25) in an appropriate position taking into consideration ease of maintenance.

The present invention is not limited to the abovementioned embodiment, and various modifications are possible. For example, the cylindrically shaped bubble generator is not limited to being two levels with an upper level and a lower level, but may also be one level, or three levels, etc. The number of blades (22) in each level may also be modified, as appropriate, in accordance with the number of levels of the cylindrically shaped bubble generator. Moreover, the arrangement of the blades (22) is not limited to being deviated by 30 degrees in the circumferential direction, but the angle at which the blades (22) are deviated may be 30 degrees or less in order to allow the tip end (31) of said maintenance jig (29) to be inserted easily. Conversely, lessening the length or diameter of the tip end (31) specifically is also possible to allow the tip end (31) to be inserted easily.

In the abovementioned embodiment, although the aeration nozzles (1) provided in both of said processing tanks (3, 4) are operated simultaneously, in order to process ions (nitrate ions, nitrite ions) generated during the decomposition of nitrogen, it is also possible to form an anaerobic tank, causing a denitrification reaction, by shortening the operation time of the aeration nozzle (1) in at least the second processing tank (4), and to pass and discharge the water through a filter tank (not shown). Moreover, an operation is also possible in which denitrification is carried out simultaneously in the first processing tank (3) and the second processing tank (4), or by alternately forming anaerobic tanks.

In order to do so, it is effective to independently provide opening-closing valves (34*a*, 34*b*) for the tanks (3, 4) on the middle part of the connection pipe (15) which connects to said aeration pump (13) and the aeration nozzles (1) provided in each of the tanks (3, 4), and to independently operate the opening-closing time of each valve (34*a*, 34*b*) with a controller (35). Moreover, it is also possible to provide an independent aeration pump on each aeration nozzle (1), and to operate said pumps simultaneously or separately.

Furthermore, although forming a completely anaerobic tank by not providing an aeration nozzle (1) on the second processing tank (4) may be considered, by equipping an anaerobic tank with an aeration nozzle (1), impurities are able to be further decomposed, if operated for short periods of time, and long-term deposition is able to be reduced.

In such cases, in order to effectively perform decomposition treatment on deposits within the processing tank, it is also effective to facilitate suctioning of deposits by designing the aeration nozzle (1) installation location (the surface facing the waste water suction port (17) of the nozzle) in the bottom surface portion of the processing tank to be in the lowest position.

What is claimed is:

1. A method for removing aeration nozzle blockages wherein blockages are removed in a state in which an aeration nozzle is installed within a waste water processing tank, wherein said aeration nozzle has, on one end, an air supply port connected to an air supply source and a waste water suction port for suctioning waste water in a processing tank, and has a micro-bubble generation unit, provided facing the air supply port, for mixing air supplied by the air supply port and waste water suctioned from the waste water suction port and generating micro-bubbles, wherein the micro-bubble generation unit is configured to have a cylindrical body arranged in a position through which air fed by the air suction port passes, said cylindrical body comprising of a cylindrical main body and a plurality of blades projecting from said main body toward a center; and the blades of said cylindrical body are characterized by being configured such that base ends of the blades are fixed on the inner surface of the cylindrical body and each tip end is formed so as to face one another around the center of said cylindrical body; and by being formed from an elastic member, tip ends of the blades are configured so as to bend with the base ends as starting points, said method being characterized by having a step for widening a clearance between the blades by elastically bending the blades, which are formed from said elastic member, using a maintenance jig having one or a plurality of tip ends and inserting between the blades and twisting the tip ends of said maintenance jig.

2. The method of claim 1 wherein the step for widening the clearance between the blades is characterized by being performed while the air supply source is being operated.

3. The method of claim 2 wherein the maintenance jig is characterized by having an extension with a length that corresponds to the depth of the waste water processing tank and being configured so as to enable the step for widening the clearance between the blades to be carried out in a state in which the waste water processing tank is storing waste water.

* * * * *